United States Patent Office 3,364,250
Patented Jan. 16, 1968

3,364,250
METHYL β-(3,5-DI-TERT-BUTYL-4-HYDROXY-PHENYL)PROPIONATE
Martin Dexter, Briarcliff Manor, N.Y., and Eric A. Meier, North Brunswick, N.J., assignors to Geigy Chemical Corporation, Greenburgh, N.Y., a corporation of Delaware
No Drawing. Continuation-in-part of application Ser. No. 164,619, Jan. 5, 1962. This application Oct. 22, 1965, Ser. No. 502,528
1 Claim. (Cl. 260—473)

This application is a continuation-in-part application of our copending application Ser. No. 164,619, filed Jan. 5, 1962, and now U.S. Patent No. 3,247,240, issued Apr. 19, 1966.

This invention relates to the stabilization of polyolefins, e.g., polypropylene, polyethylene, polystyrene, and/or other unstable organic material with stabilizers containing a substituted phenol group. The invention also relates to a method of preparing stabilized polyolefins, e.g., polypropylene, and other organic material subject to degradation, or deterioration due to radiant energy such as visible and ultraviolet light.

More specifically, the invention pertains to stabilization of polypropylene and other organic material normally subject to oxidative, thermal or light induced deterioration with a stabilizer of the formula:

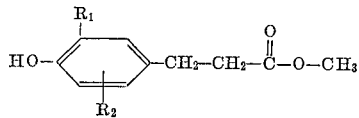

I wherein $R_1$ is a tertiary alkyl group, e.g., of 4 to 18 carbon atoms, preferably a tertiary butyl group;
$R_2$ represents an alkyl group, e.g., of from 1 to 18 carbon atoms, especially from 1 to 8 carbon atoms, or hydrogen; a tertiary butyl group being preferred.

Thus the preferred compound of this invention is methyl β - (3,5-di-tert-butyl-4-hydroxyphenyl)propionate, viz:

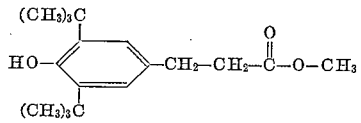

II

It is a prime object of this invention to provide stable organic material, e.g., stable polymeric material. In this specification it is understood that polymeric material means polyolefins such as polyethylene, polypropylene, and polystyrene. Preferably the polyolefins are of high molecular weight, e.g., above 1000 into the hundreds of thousands range. The polyethylenes and polypropylenes may be of high density, medium density or low density.

Polymeric materials such as the foregoing find use as thermoplastic molding or coating agents. Moreover, because of their high dielectric strengths and their resistance to water, they are particularly useful as insulators or dielectrics in condensers and other such equipment. It is known that these polyolefins, e.g., polyethylene, polypropylene and polystyrene are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc.

Not only homopolymeric material, but also copolymers and physical mixtures thereof are stabilized according to the present invention.

Rubber, both natural and synthetic may be stabilized by the stabilizers of this invention. For example, high impact polystyrene containing copolymers of butadiene and styrene as well as acrylonitrile-butadiene-styrene polymers are stabilized according to the invention.

The invention is also particularly useful in stabilizing lubricating oils of various types including aliphatic esters such as, e.g., dihexyl azelate, di-(2-ethylhexyl)azelate, di-(3,5,5-trimethylhexyl)glutarate, di - (3,4,4 - trimethylpentyl)glutarate, di-(2-ethylhexyl)pimelate, di-(2-ethylhexyl) adipate, diisoamyl adipate, triamyl tricarballylate, pentaerythritol tetracaproate, dipropylene glycol dipelargonate, 1,5-pentanediol-di-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g., gasolines, both natural and synthetic, in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

Also embraced within this invention are polyamides, e.g., polyhexamethylene adipamide; polyesters such as polymethylene terephthalates; polycarbonates; polyacetate; polyethylene oxide; polyurethanes such as are prepared from polyols and organic polyisocyanates.

In general, stabilizers of the invention are employed in a concentration of from about 0.001% to about 5% by weight, preferably from about 0.01% to about 1% by weight. The specific concentration used varies with the substrate and the stabilizer, but the following ranges are preferred.

Concentrations of about 0.001% to about 1% by weight for the stabilizer in polyethylene are useful. In polypropylene from about 0.05% to about 1% by weight of stabilizer is especially useful. For polystyrene from about 0.1% to about 1% by weight is useful. In mineral oils, concentrations of from about 0.005% to about 1% by weight of stabilizer are used. Gasolines are stabilized with from about 0.01% to about 0.1% by weight of stabilizer, preferably about 0.05% by weight. Fatty material of animal origin such as lard is stabilized with from about 0.001% to about 0.1% by weight of stabilizer. Oils of vegetable origin such as cotton seed oil are similarly stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as e.g., about 0.01% by weight in heptaldehyde. High temperature lubricants which are essentially diesters, e.g. diisoamyladipate, are stabilized with from about 0.5% to about 5%, preferably about 2%, by weight of a stabilizer according to the invention.

The compounds of this invention may be used also to stabilize organic material in combination with other additive agents such as, e.g., antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet absorbers, dyes, pigments, metal chelating agents, etc.

A particularly useful stabilizer system for polymeric material comprises a stabilizer of the Formula I and dilauryl-beta-thio-di-propionate (hereinafter referred to as DLTDP). Generally from about 0.005% to about 10% (based on the stabilized composition) by weight of DLTDP and other stabilizers, e.g. of the Formula I, are employed. Polypropylene is advantageously stabilized with about 0.5% by weight of DLTDP and 0.5% by weight of a stabilizer of the Formula I.

In place of DLTDP, other similar diesters are usefully employed with the stabilizers of the Formula I for stabilization of organic material, e.g., polypropylene. Such diesters as the following are useful:

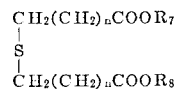

wherein $n$ is a small number, e.g. 1 or 2; and $R_7$ and $R_8$ are each independently an alkyl group, e.g. having 8 to 24 carbon atoms.

The following examples describing certain representative embodiments of this invention will serve to further illustrate the nature of the invention. Parts are by weight and temperatures in degrees centigrade unless otherwise indicated. It is to be understood that the examples are merely illustrative and intended to enable those skilled in the art to practice the invention in all of the embodiments flowing therefrom and do not in anyway limit the scope of the invention defined in the claim.

EXAMPLE 1

*Preparation of methyl β-(3,5-di-tertiary butyl-4-hydroxyphenyl) propionate via potassium metal*

To 500 parts by volume of dry tertiary butyl alcohol contained in a suitable flask (fitted with mechanical stirrer, inert gas inlet, thermometer, condenser, and dropping funnel) is added 2.1 parts of potassium metal. After the ensuing reaction is complete there is added 37.3 parts of 2,6-di-tertiary butyl phenol followed by 17.7 parts of methylacrylate rapidly in that order. The stirred reaction mixture is heated to 50° for 18 hours and allowed to cool. The solvent is removed under reduced pressure and the residual mass neutralized with diluted hydrochloric acid and extracted two times with 200 parts by volume portions of ethyl ether. The combined ethereal extracts are washed two times with 100 parts by volume portions of water and dried over anhydrous sodium sulfate. The ether layer is then removed via filtration and concentrated on the steam bath. The residual oily mass is then vacuum distilled, collecting the fraction boiling from 125–130° at 0.1 mm. Hg pressure. On standing, the pale yellow oil crystallized to a solid product, methyl β-(3,5-di-tert-butyl-4-hydroxyphenyl)propionate of melting point 63.0–64.5°. Recrystallization from hexane yields a white solid of melting point 66.0–66.5°.

| Analysis | C | H | Saponification Equivalent |
|---|---|---|---|
| Calculated for $C_{18}H_{28}O_3$ | 73.93 | 9.95 | 292.4 |
| Found | 74.27 | 9.90 | 292±10 |

In a similar way, the corresponding alkyl esters are obtained from the respective alkyl acrylates: ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc.

If in the foregoing example there is substituted for potassium tertiary butoxide catalyst either benzyltrimethylammonium methoxide or sodamide, then the desired product is obtained.

The same reaction conditions are employed as above with exception that a slurry of 3.5 parts of potassium hydroxide in 500 parts by volume of tertiary butyl alcohol is used in the place of potassium (as the alcoholate) as the base catalyst. A somewhat lower yield of the product ester is realized by this method.

EXAMPLE 2

*Stabilization of polypropylene*

Unstabilized polypropylene powder (Hercules Profax 6501) is thoroughly blended with 0.5% by weight of methyl β-(3,5-di-tert-butyl-4-hydroxyphenyl)propionate, made according to Example 1 hereinabove. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of methyl β-(3,5-di-tert-butyl-4-hydroxyphenyl)propionate and polypropylene is stabilized against oxidative deterioration.

In a similar manner as in this example, stable compositions of polypropylene are prepared with 0.5% by weight of compounds of Formula I together with 0.5% by weight of dilauryl-β-thio-dipropionate.

EXAMPLE 3

*Stabilization of mineral oil*

A water-white, refined (U.S.P. grade) mineral oil (Esso Primol D) is stabilized under the following test conditions.

A sample of mineral oil (10 parts) is placed in a Sligh-type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm. Hg pressure within the flask with reference to the maximum pressure obtained at 150°. The stabilized mineral oil contains 0.1% by weight of methyl β-(3,5-di-tert-butyl-4-hydroxyphenyl)propionate.

EXAMPLE 4

*Stabilization of a resin containing elastomer*

High impact polystyrene resin containing elastomer (i.e. butadiene-styrene) is stabilized against loss of elongation properties by incorporation of 0.5% by weight of methyl β-(3,5-di-tert-butyl-4-hydroxyphenyl-propionate.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mils). The sheets are then cut into strips, approximately 4 x 0.5 inches. A portion of these strips is then measured for length of elongation in the Instron tensile tester (Instron Engineering Corporation, Quincy, Mass.). The remaining portion of the strips is aged in a forced draft oven for 6 weeks at 75° and thereafter tested for elongation.

EXAMPLE 5

*Stabilization of acrylonitrile-butadiene-styrene polymer*

A 300 gram sample of acrylonitrile-butadiene-styrene polymer (available under the name of Tybrene from Dow Chemical Company) fused on a two roll mill preheated to 400° F. had added to it 1.0 by weight methyl β-(3,5-di-tert-butyl-4-hydroxyphenyl)propionate, and 1.0% calcium stearate lubricant. The fusing of the polymer and addition of additives were completed in approximately five minutes. The composition resulting was then milled for an additional 60 minutes. Thereafter 60 gram samples were removed and cut into 4 x 4 x 0.125 inches plaques which were compression molded at 390° F. for 7 minutes at 1500 p.s.i. and then cooled in a water cooled platen press.

Notched Izod impact strength of the samples was then measured on the TNI impact tester to determine change in plastic toughness during aging according to ASTM D256-56 method.

The stabilized samples exhibited average strength of 3.18 foot-pounds/inch whereas unstabilized control samples had strength of 2.60 foot-pounds/inch.

Samples prepared in the foregoing manner which had 0.5% of methyl β-(3,5-di-tert-butyl-4-hydroxyphenyl)propionate and 0.5% of di-stearyl-beta-thio-di-propionate added, exhibited a strength of 3.88 foot-pounds/inch, a surprising 49% improvement over unstabilized control samples.

The stabilized samples also exhibited improved retention of clarity in contrast to control samples which discolored rapidly.

What is claimed is:

1. Methyl β-(3,5-di-tert-butyl-4-hydroxyphenyl)propionate.

References Cited

UNITED STATES PATENTS 3,112,338  11/1963  Smutny et al. _____ 260—45.85
3,244,668  4/1966  Knapp et al. _____ 260—45.85

DONALD E. CZAJA, *Primary Examiner.*

LEON J. BERCOVITZ, *Examiner.*

G. W. RAUCHFUSS, *Assistant Examiner.*